(12) United States Patent
Cava

(10) Patent No.: US 6,508,074 B1
(45) Date of Patent: Jan. 21, 2003

(54) AIR CONDITIONING SYSTEM AND METHOD

(76) Inventor: Frank James Cava, P.O. Box 937, Folsom, CA (US) 95763-0937

( * ) Notice: Subject to any disclaimer, the term of this patent is extended or adjusted under 35 U.S.C. 154(b) by 0 days.

(21) Appl. No.: 09/898,511

(22) Filed: Jul. 3, 2001

Related U.S. Application Data

(63) Continuation-in-part of application No. 09/387,393, filed on Sep. 2, 1999, now Pat. No. 6,253,560.
(60) Provisional application No. 60/099,054, filed on Sep. 3, 1998.

(51) Int. Cl.[7] .................................................. B60H 1/32
(52) U.S. Cl. ............................ 62/244; 62/259.1; 62/419
(58) Field of Search .......................... 62/405, 419, 404, 62/259.1, 244

(56) References Cited

U.S. PATENT DOCUMENTS

| | | | |
|---|---|---|---|
| 2,047,249 A | * | 7/1936 | Ballard ........................ 165/135 |
| 2,104,589 A | * | 1/1938 | Hartman ................. 128/204.15 |
| 2,350,348 A | | 6/1944 | Gaugler |
| 2,489,009 A | * | 11/1949 | Corhanidis .................... 62/267 |
| 2,538,382 A | * | 1/1951 | Reilly .......................... 454/119 |
| 2,995,906 A | * | 8/1961 | Brandimarte ................ 165/124 |
| 3,156,101 A | | 11/1964 | McGuffey |
| 3,166,912 A | * | 1/1965 | Patrick ......................... 62/337 |
| 4,003,214 A | | 1/1977 | Schumacher |
| 4,403,644 A | | 9/1983 | Hebert |
| 4,562,702 A | | 1/1986 | Endo et al. |
| 4,590,773 A | | 5/1986 | Hoshino et al. |
| 4,600,050 A | | 7/1986 | Noren |
| 5,448,897 A | | 9/1995 | Dinh |

* cited by examiner

*Primary Examiner*—William E. Tapolcai
(74) *Attorney, Agent, or Firm*—Edward S. Wright

(57) ABSTRACT

Air conditioning system and method in which a refrigerant from a compressor is circulated through a cooling element within a hermetically sealed, thermally insulated cooling compartment, and cooled air from the compartment is delivered to a space to be cooled. In one disclosed embodiment, the cooling compartment is located at the center of a solid cube of insulative material and is heavily insulated from the ambient conditions outside the cube.

9 Claims, 7 Drawing Sheets

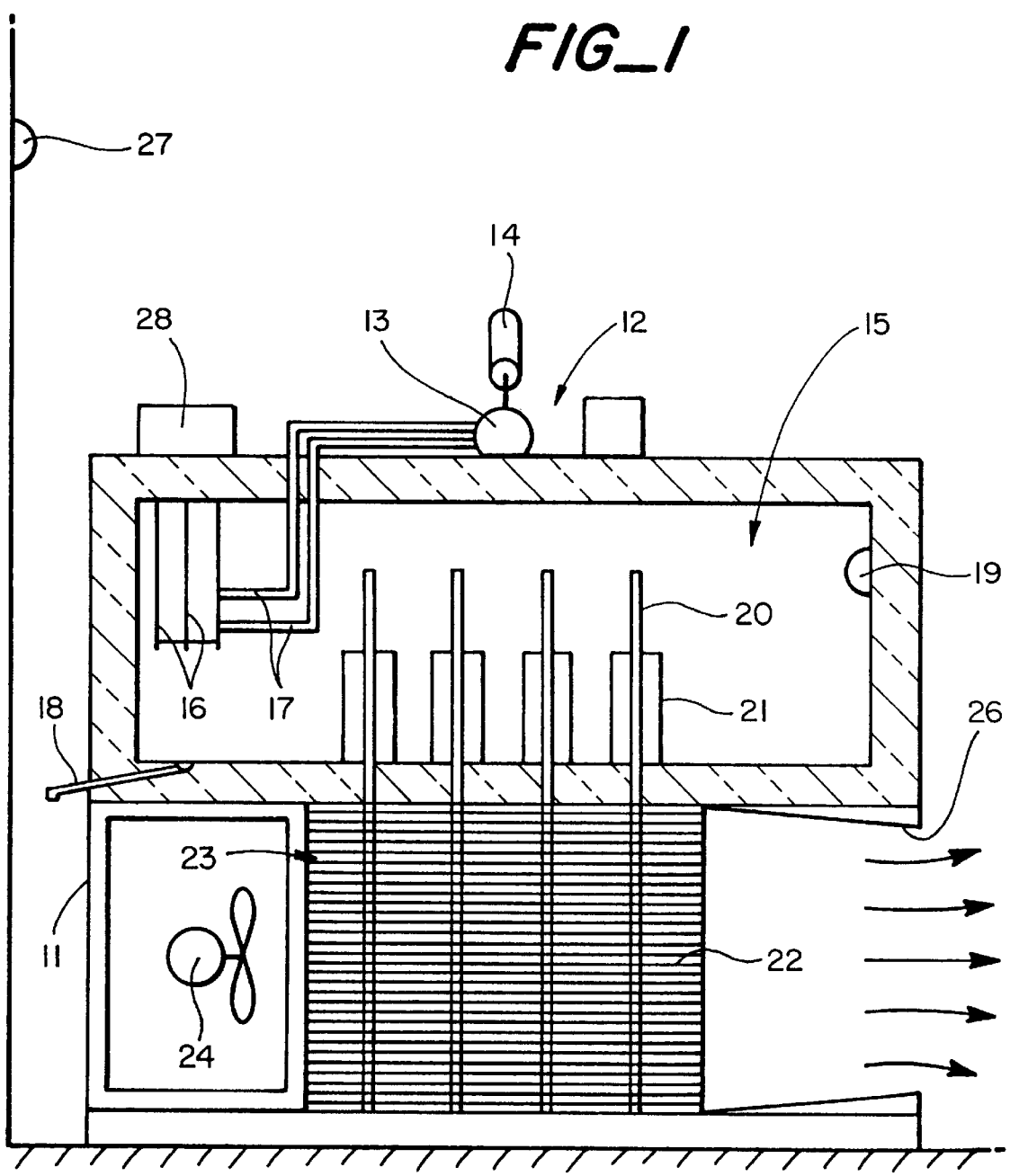
FIG_1

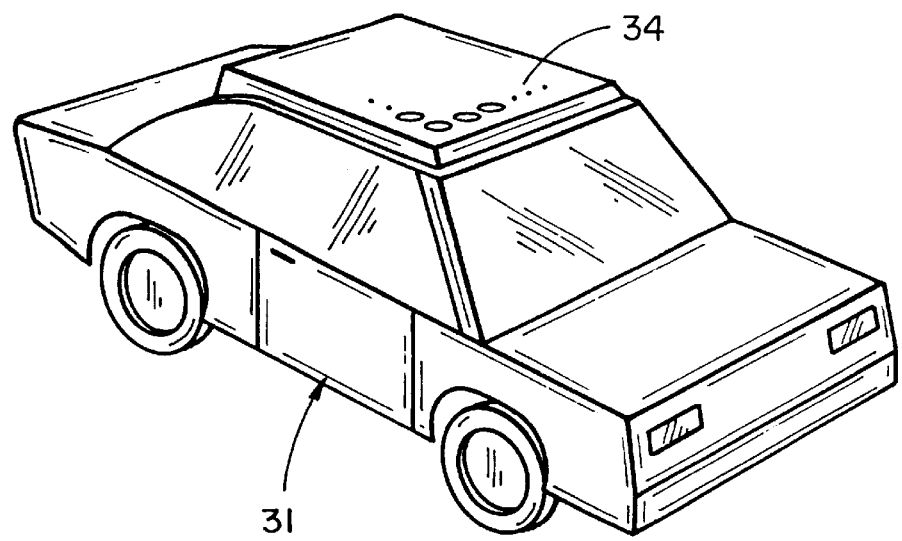
FIG_2
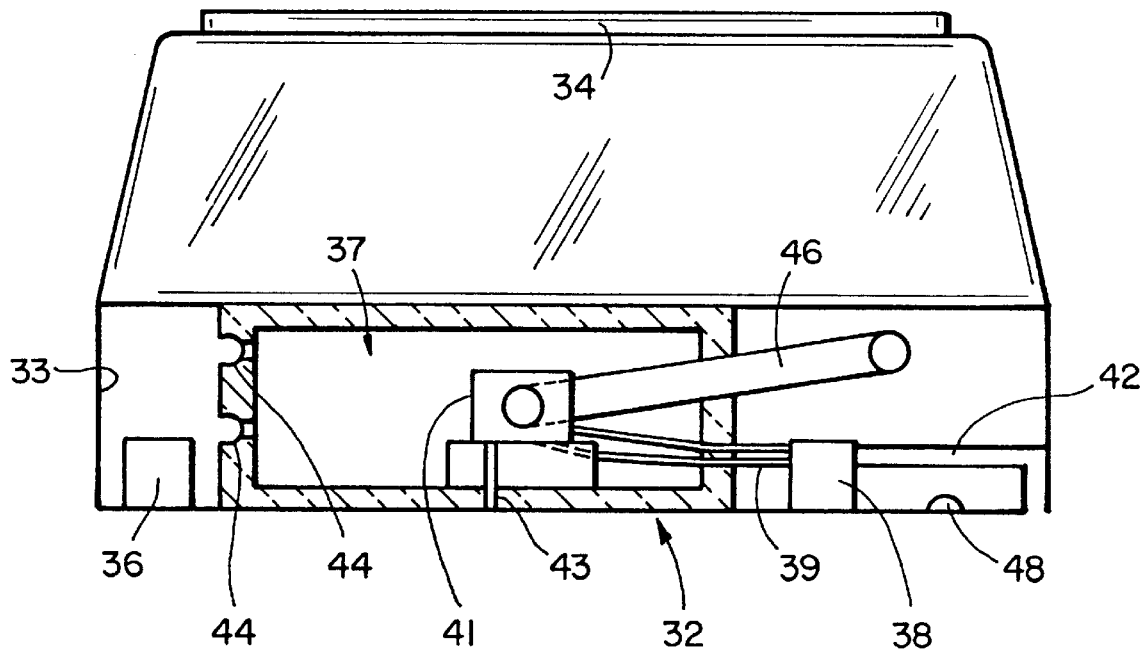
FIG_3

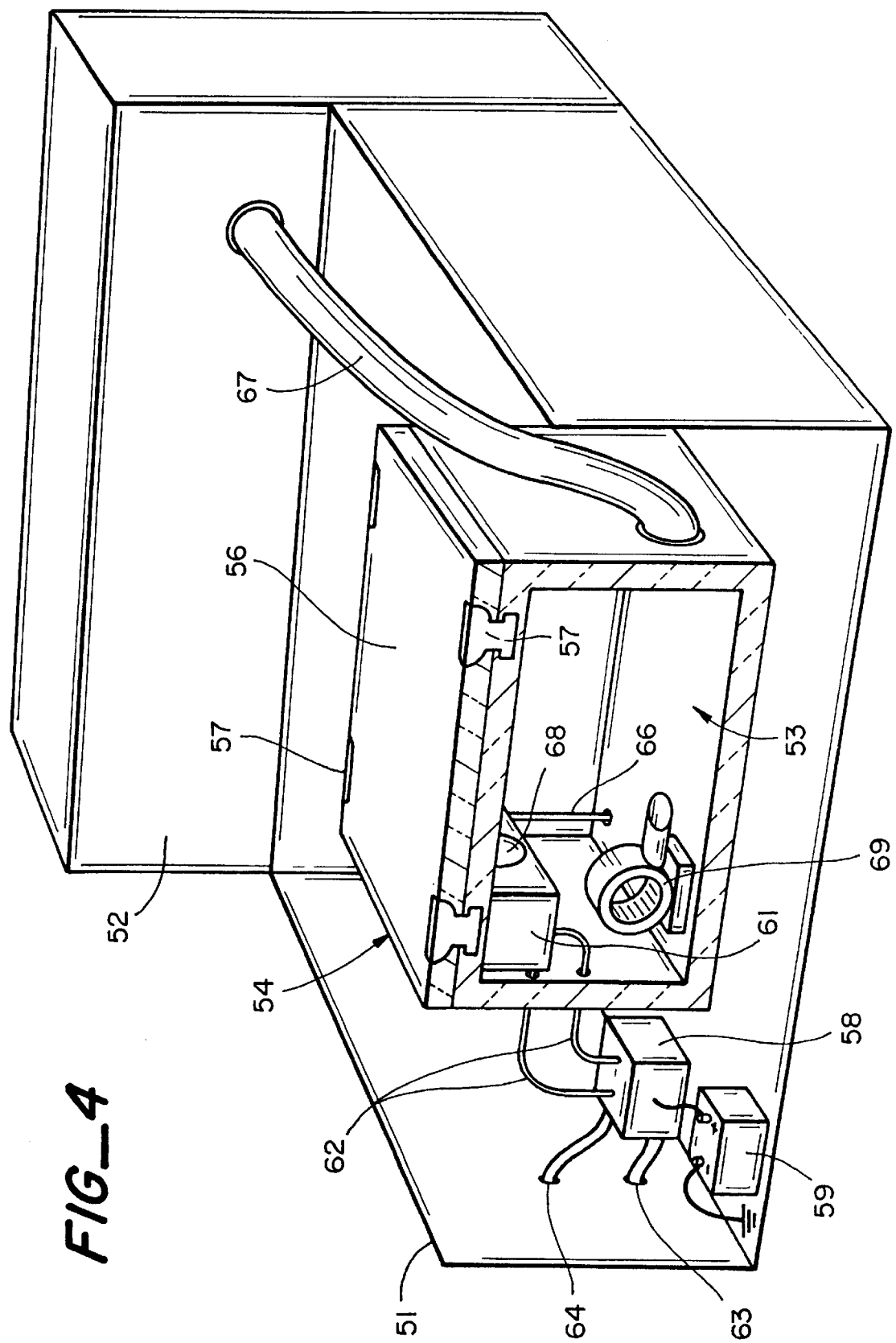
FIG_4

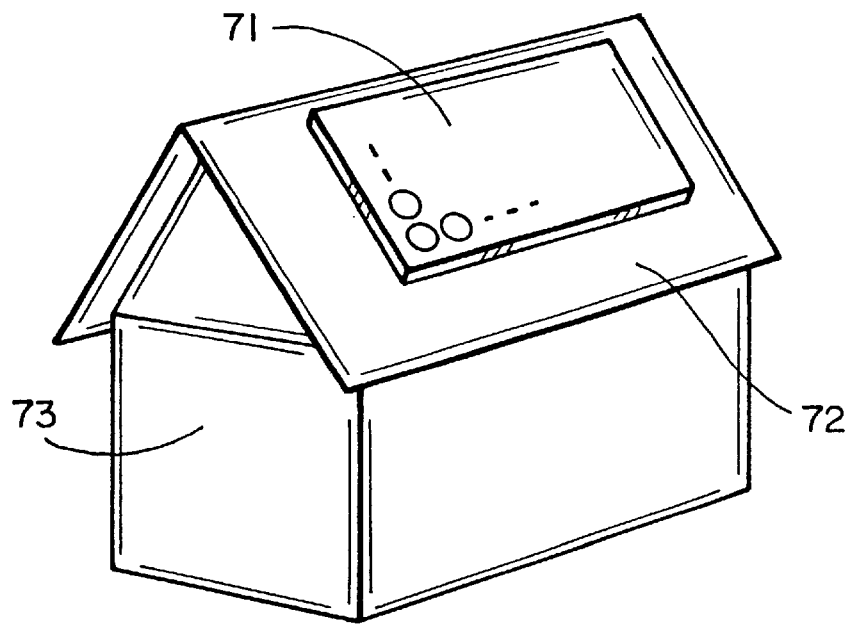
FIG_5
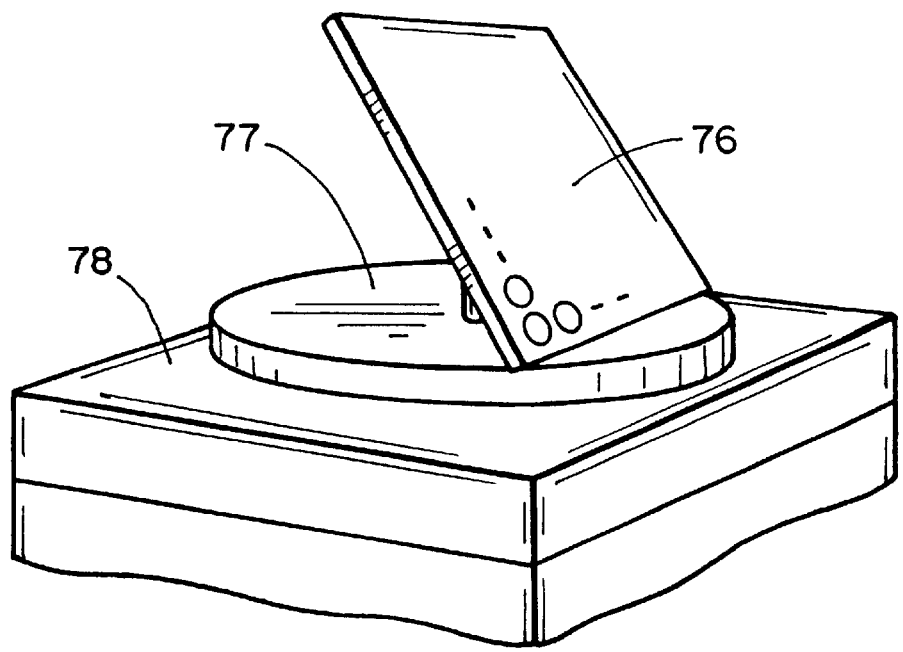
FIG_6

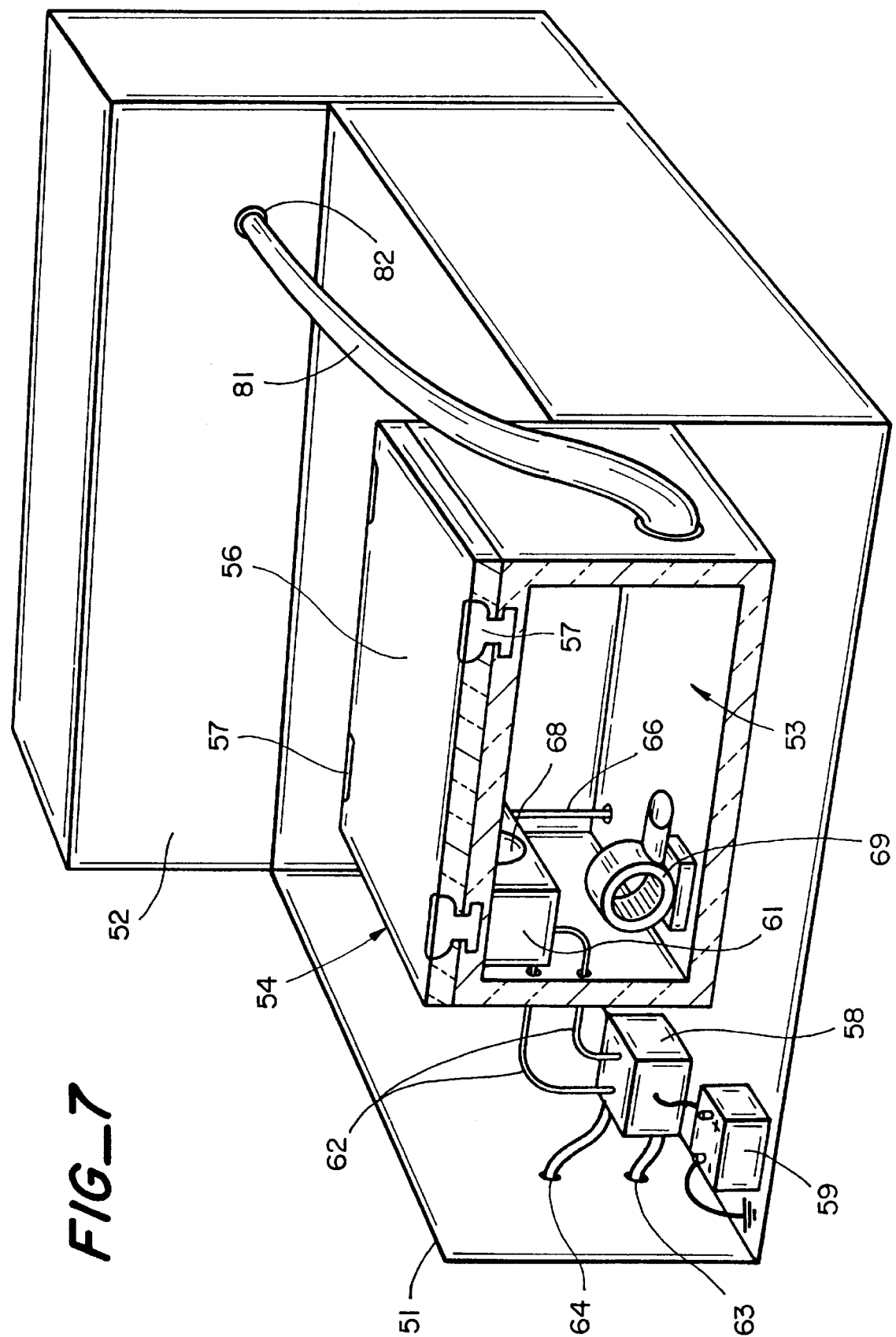

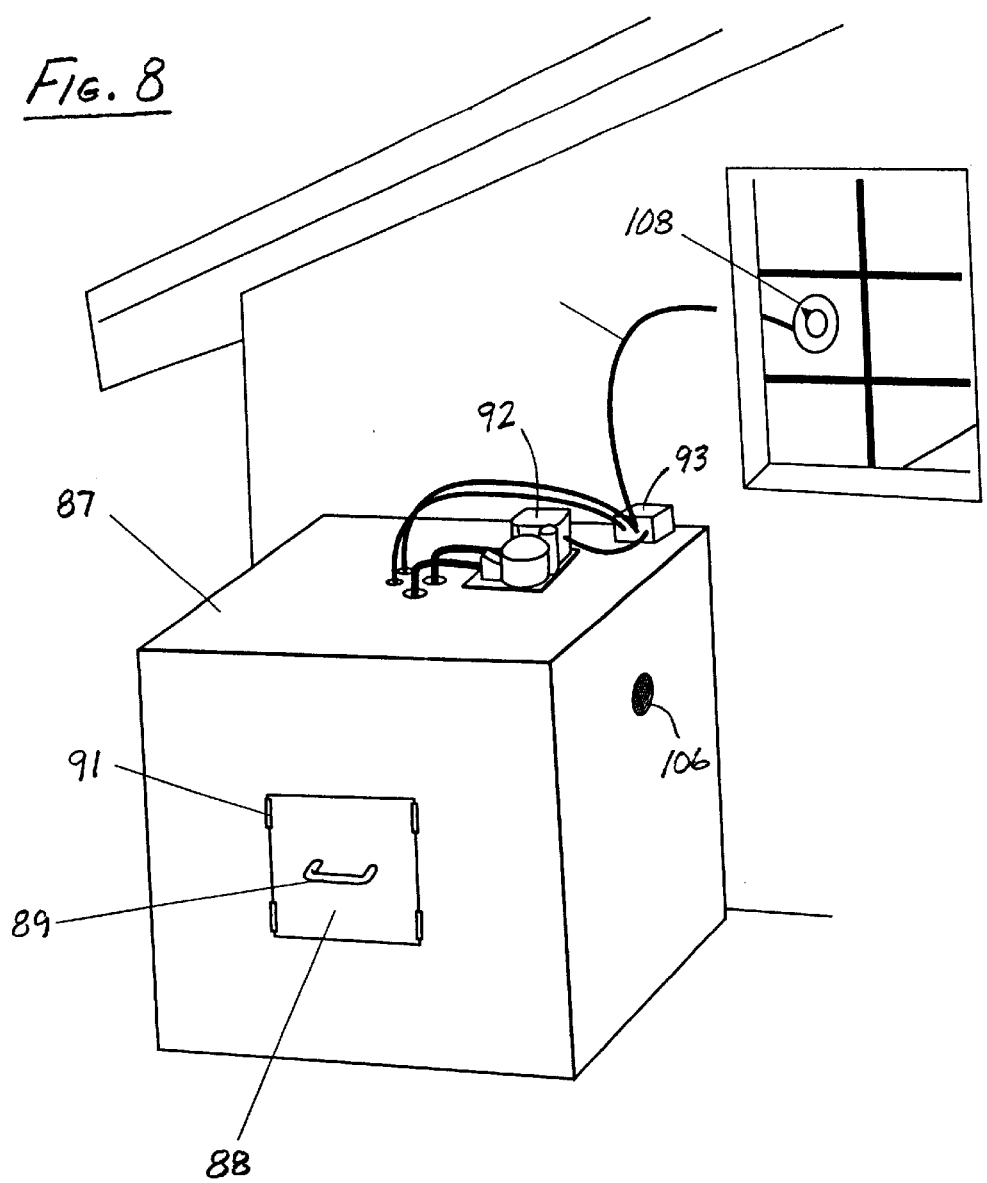

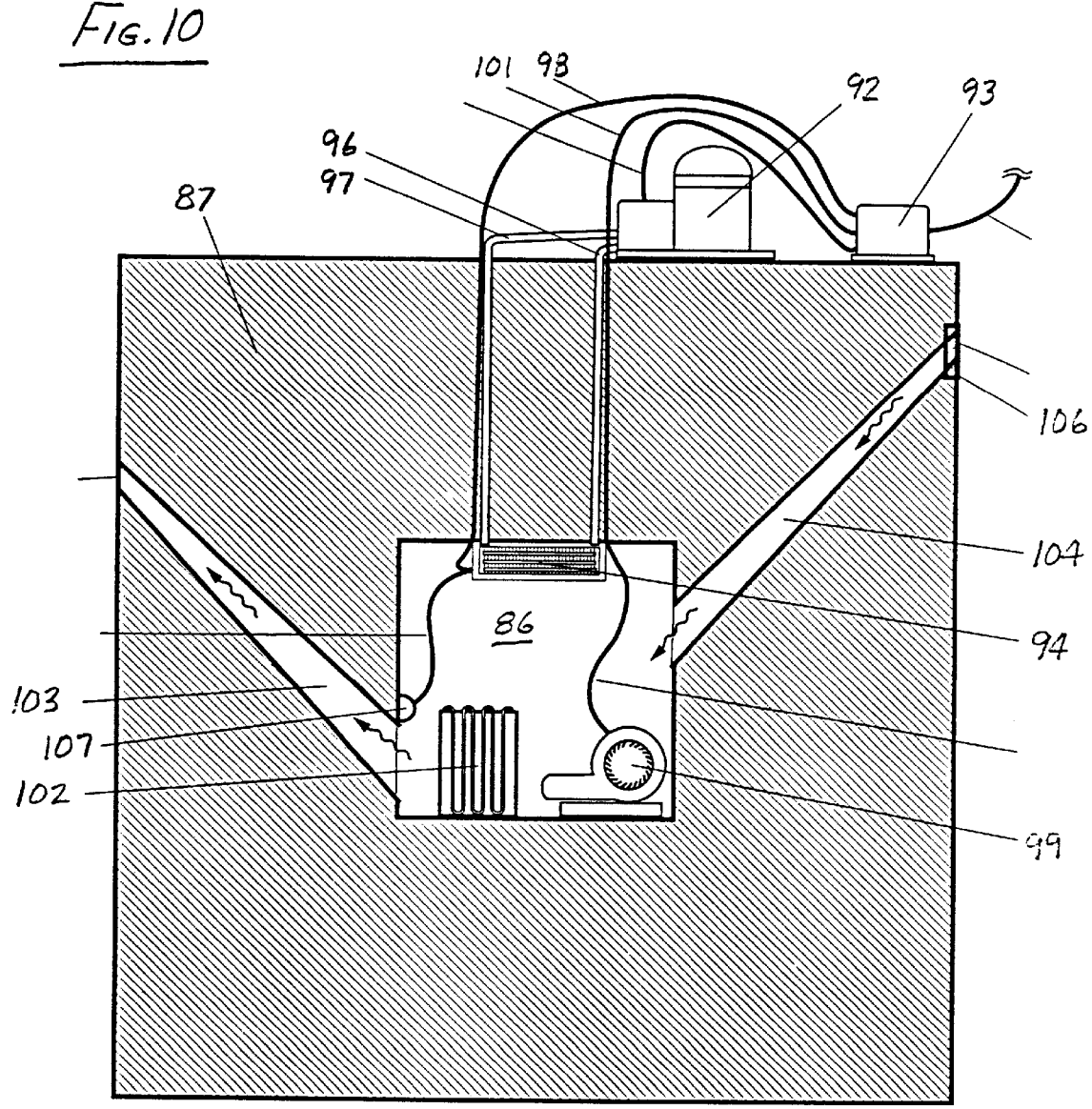

AIR CONDITIONING SYSTEM AND METHOD

This is a continuation-in-part of Ser. No. 09/387,393, filed Sep. 2, 1999 now U.S. Pat. No. 6,253,560, which was based upon Provisional Application No. 60/099,054, filed Sep. 3, 1998.

This invention pertains generally to the heating and cooling of enclosed spaces and, more particularly, to an air conditioning system and method.

In the air conditioning systems most commonly used today, warm air is drawn from the space to be cooled, refrigerated, and then gently blown back into that space. This type of system is generally effective in producing the desired cooling, but it is relatively expensive to operate.

Another type of air conditioning system which is less commonly employed is evaporative cooling. In that system, air is simply blown through a wet media and into the space to be cooled. This type of system is less costly to operated than a refrigerated system, but it tends to produce humidity and is less effective than a refrigerated system.

It is in general an object of the invention to provide a new and improved air conditioning system and method.

Another object of the invention is to provide an air conditioning system and method of the above character which overcome the limitations and disadvantages of the prior art.

These and other objects are achieved in accordance with the invention by providing an air conditioning system and method in which a refrigerant from a compressor is circulated through a cooling element within a hermetically sealed, thermally insulated cooling compartment, and cooled air from the compartment is delivered to a space to be cooled. In one disclosed embodiment, the cooling compartment is located at the center of a solid cube of insulative material and is heavily insulated from the ambient conditions outside the cube.

FIG. 1 is an elevational view, partly broken away and somewhat schematic, of one embodiment of an air conditioning system incorporating the invention.

FIG. 2 is an isometric view of an embodiment of an automobile having an air conditioning system in accordance with the invention.

FIG. 3 is an elevational view, partly broken away and somewhat schematic, of the air conditioning system in the embodiment of FIG. 2.

FIG. 4 is an isometric view, partly broken away and somewhat schematic, of another embodiment of an air conditioning system incorporating the invention.

FIG. 5 is an isometric view of an embodiment of a small building having a solar panel mounted thereon for powering an air conditioning system to cool the interior of the building in accordance with the invention.

FIG. 6 is a fragmentary isometric view of a solar panel mounted on top of a structure for powering an air conditioning system to cool the interior of the structure in accordance with the invention.

FIG. 7 is an isometric view, partly broken away and somewhat schematic, of another embodiment of an air conditioning system incorporating the invention.

FIG. 8 is an isometric view of another embodiment of an air conditioning system incorporating the invention.

FIG. 9 is a fragmentary isometric view of the embodiment of FIG. 8 with an access plug removed to provide access to an internal cooling cavity.

FIG. 10 is a vertical sectional view, somewhat schematic, of the embodiment of FIG. 8.

As illustrated in FIG. 1, the air conditioning system includes generally rectangular sheet metal housing 11 on which a small refrigeration unit 12 of conventional design is mounted. This unit includes a compressor 13 which is driven by a small DC brushless motor 14, e.g. one which operates on about 65 watts of power.

The refrigeration unit is mounted on top of and outside the enclosure so that heat expelled by the unit during operation will flow upwardly and away from the enclosure and the components located therein.

A hermetically sealed heavily insulated cooling compartment 15 is mounted inside the enclosure. The walls of this compartment are fabricated of a material such as polyisocyaurenate which provides a high degree of thermal insulation so that the interior of the compartment is well insulated from the outside. In one embodiment, the compartment has a volume on the order of 7 cubic feet, and the polyisocyaurenate walls are approximately 6 inches thick.

A cooling element which serves as the evaporator in the refrigeration system is mounted inside the cooling compartment. In the embodiment illustrated, this element comprises a set of three cooling plates 16 which are connected to the compressor by lines 17 through which the coolant or refrigerant is circulated. Those lines pass through hermetically sealed openings in the top wall of the compartment. A drainage tube 18 is positioned beneath the cooling plates for carrying condensate and water produced during defrosting out of the system. This tube passes through a sealed opening in the bottom wall of the compartment and an opening in the sheet metal enclosure.

The temperature within the cooling compartment is controlled by a thermostat 19 which is mounted on one wall of the compartment and is connected to the refrigeration unit in a conventional manner. This thermostat is set to maintain the temperature within the compartment at the coldest level possible without creating too much frost, typically about 35° F.

A plurality of copper tubes 20 extend vertically within the compartment, pass through sealed openings in the bottom wall of the compartment, and extend into the lower portion of the sheet metal enclosure beneath the compartment. These tubes carry coolant having a relatively low freezing point which is cooled by the chilled air in the compartment. The tubes are surrounded by a eutectic material 21 which, when cooled, tends to retain its cold properties with little or no resulting condensation.

The lower portion of the tubes connected to fins 22 are form a tube and fin radiator or heat exchanger 23. Air is blown though the radiator by a fan 24 and out through an opening 26 in the side wall of the housing to the space to be cooled. This fan is driven by another small DC brushless motor which typically operates on a power of about 100 watts.

The temperature of the cooled space is controlled by a thermostat 27 which is mounted on a wall of the space and connected to blower fan 24.

Operating power for the DC motors in this embodiment is provided by an AC to DC converter 28 which is mounted on top of the sheet metal enclosure and connected to the power grid. Operation and use of the embodiment of FIG. 1, and therein the method of the invention, is as follows. The temperature within compartment 15 is maintained at a chilled level by the action of the compressor circulating the refrigerant through cooling plates 16. The coolant within tubes 20 is thereby cooled, and the cooled fluid tends to sink into the lower portions of the tubes. When air is blown through heat exchanger 23, heat is transferred from the air to the coolant, and the heated coolant rises within the tubes back to the cooling compartment where it is cooled and returns to the heat exchanger. The cool air from the heat exchanger is blown into the space to be cooled. When thermostat 27 senses that the temperature has been reduced to the desired level, it turns the blower fan off until the temperature rises above the desired level, at which point it turns it on again.

FIGS. 2 and 3 illustrate an embodiment in which the air conditioning system is utilized in an automobile 31. In this embodiment, the system 32 is mounted in the trunk 33 of the vehicle and is powered by a panel of photovoltaic solar cells 34 which are mounted on the roof. This system is not intended to replace the regular air conditioning system of the vehicle, but rather to supplement it by providing cooling when the regular system is not operating, e.g. while the car is parked.

The solar panel has a power output on the order of 55–145, watts and is connected to a storage battery 36 which is mounted in the trunk with the rest of the system.

The system includes a cooling compartment 37 which is similar to compartment 15 in the embodiment of FIG. 1 in that it is hermetically sealed and well insulated. A refrigeration unit 38 is mounted in the trunk outside the compartment, with lines 39 carrying a refrigerant which circulates between the compressor and an evaporator coil 41 inside the compartment. The compressor is driven by a 12 or 24 volt DC brushless motor which is powered by the battery and the solar panel. An exhaust duct 42 carries heat from the compressor out of the trunk. That heat includes heat produced by the compressor as well as heat which is carried back to the compressor by the circulating refrigerant. A drain tube 43 is connected to the pan of the evaporator coil for carrying condensate and water from defrosting out of the system discharging it beneath the vehicle.

A pair of small fans 44 are mounted on the side wall of the cooling compartment for blowing air from the compartment through a duct 46 into the passenger compartment of the vehicle, These fans have small DC brushless motors which are also powered by the battery and the solar panels. A thermostat 48 controls the operation of the compressor to control the temperature of the cooling compartment. Fans 44 can be manually operated, or an additional thermostat (not shown) can be placed in the passenger compartment to control the fans.

Operation and use of the embodiment of FIGS. 2–3 is similar to that of the embodiment of FIG. 1. In this embodiment, however, the cool air which is blown into the space to be cooled is obtained directly from-the cooling compartment, rather than being obtained from a heat exchanger outside the compartment. Thus, the refrigerant flowing through cooling coil 41 cools the air in the compartment, and the cooled air is blown into the passenger compartment by fans 44. The compressor motor and the fan motors are all powered by the battery, which is charged by the solar panel. Alternatively, the motors can be powered directly from the solar panel, in which case the battery can be eliminated, if desired.

In the embodiment of FIG. 4, the system includes a generally rectangular housing 51 which can be mounted in the trunk of a car or attached to the structure in which the space to be cooled is located, with the vehicle or structure being illustrated schematically at 52. In this embodiment, the cooling compartment 53 is formed by thermally insulated enclosure 54 similar to a heavy duty ice chest having a removable lid 56 which is held in place by latches 57.

A refrigeration unit 58 is mounted in the housing outside the cooling compartment, and is driven by a small DC brushless motor which is powered by a battery 59. The compressor is connected to an evaporator coil 61 within the cooling compartment by lines 62 which carry a suitable refrigerant. Ventilation for the compressor is provided by an inlet duct 63 and an exhaust duct 64. A drain tube 66 extends from the drainage pan of the cooling coil through the bottom walls of the cooling compartment and the housing for removing water from the coil. An outlet duct 67 extends between the cooling compartment and the space to be cooled.

Cooled air is blown from the cooling coil into the cooling compartment by a small fan 68 which is mounted in an outlet opening in the wall of the housing in which the coil is mounted. The cooled air is blown out of the cooling compartment by a squirrel cage blower 69 which is mounted on the bottom wall of the compartment. Air from within the space to be cooled is returned to the cooling compartment via a return duct (not shown) and recirculated. Both fan 68 and blower 69 have small DC brushless motors which are powered by the battery. If desired, another type of blower,, such as an axial fan, can be utilized instead of the squirrel cage blower. Operation and use of this embodiment is similar to that described above in connection with the other embodiments. In this embodiment, however, fan 68 draws the air gently across the cooling coil in order to minimize the build-up of moisture and dripping from the coil. The air which has been cooled by the coil collects in the cooling compartment from which it is blown into the cooled space by blower 69. Latches 57 permit the lid to be removed from the cooling compartment for periodic cleaning and maintenance.

FIG. 5 illustrates a solar panel 71 mounted on the roof 72 of a building 73 for powering an air conditioning system for cooling the interior of the building. The roof is sloped at an angle on the order of 45 degrees, and preferably faces in a southerly direction to maximize exposure to the sun. With this angle of inclination and exposure, the solar panel can be mounted in a fixed position on the roof. The air conditioning system can either be mounted outside the building, or it can be mounted in the attic or other portion of the building outside the area to be cooled.

FIG. 6 illustrates a solar panel 76 which is mounted on a base 77 which permits both the angle of inclination and the orientation of the panel to be adjusted. The base is mounted on top of the structure 78 in which the space to be cooled is located. This system is particularly suitable for use with portable buildings and other structures which do not otherwise have the desired angle and exposure.

The embodiment of FIG. 7 is similar to the embodiment of FIG. 4, with like reference numerals designating corresponding elements in the two embodiments. In the embodiment of FIG. 7, however, the outlet duct 81 decreases in diameter from the cooling compartment to the space to be cooled, and the cooled air is forced through a relatively small opening 82 at the distal end of the duct. As the air is forced through the tapered duct, it is compressed, and as it is released from that duct and enters the space to be cooled, it expands and decreases in temperature, thereby producing further cooling of the space.

In the embodiment of FIGS. 8–10, a cooling compartment 86 is formed at the center of a solid cube 87 of insulating material such as polyisocyaurenate. The dimensions (height, width and depth) of the compartment are approximately one-third those of the cube, and the walls of the housing formed by the cube have a thickness which is approximately equal to the dimensions of the compartment. Thus, for example, with a cube which measures 3 feet long on a side, the compartment is 1 foot high, 1 foot wide and 1 foot deep, and the insulative walls each have a thickness of about 1 foot. As discussed more fully hereinafter, this heavy insulation is advantageous in that it reduces the amount of power required to produce cooling. To further reduce improve efficiency, the unit can is preferably located in a relatively cool place such the north side of a building, out of the sun.

One wall of the housing is formed as a removable plug 88 in order to provide access to cooling compartment 86. This access door is provided with a handle 89 and latches 91 which hold it in place in the cube.

A low power refrigeration unit 92 is mounted on the top wall of the cubical housing outside the chamber. This unit includes a fractional horsepower drive motor which, in the embodiment illustrated, is DC operated and obtains operating power through a converter 93 that operates on AC line current. If desired, however, either an AC motor or other types of DC power sources (e.g. solar cells or batteries) can be employed.

An evaporator 94 is mounted on the top wall of the cooling compartment, and refrigerant is circulated through the evaporator from the refrigeration unit through lines 96, 97. The evaporator includes a fan (not shown) which receives operating power from the converter through cable 98. A blower 99 is also mounted in the cooling compartment and connected to the converter by a cable 101, and a cold holding plate 102 comprising a tubular metal coil filled with a eutectic solution is positioned directly in front of the blower outlet.

Cool air is discharged from the cooling compartment through an outlet duct 103. The outlet duct is tapered, decreasing in size toward its outlet end, which tends to increase the pressure and thereby reduce the temperature of the air passing through it. From the outlet duct, the cool air is carried to the space to be cooled by suitable ducting (not shown).

Air is supplied to cooling compartment through an inlet duct 104. This duct is also tapered and increases in size as it approaches the cooling compartment. This taper serves to prevent hotter outside air from flowing into the chamber too rapidly and impairing the effectiveness of the unit. A closed ring water filled evaporative air filter 106 is provided at the inlet end of the inlet duct to pre-cool the incoming air and to keep dust, dirt and other particles from getting into the chamber.

A thermostat 107 is mounted on a wall of the cooling compartment and connected to evaporator 94 and to refrigeration unit 92 to control the temperature within the compartment. The thermostat turns the evaporator fan and the refrigeration unit on and off as the temperature within the compartment rises above and falls below a preset level, e.g. 35° F.

Another thermostat 108 is mounted on a wall of the space to be cooled to control the operation of blower 99 in the cooling compartment. That thermostat turns the blower on and off as the temperature in the space rises above and falls below a desired level.

Operation and use of this embodiment is similar to that of FIG. 4. However, because the walls of the cube are so thick, the cooling compartment is extremely well insulated, and the temperature within that compartment can be much lower than the outside ambient temperature. Also, with the heavy insulation, less cooling power is required to keep the compartment at a very cold temperature. The blower and venting system can keep a stead flow of cold air coming out of the unit without raising the temperature of the cooling compartment. The tapered air inlet prevents hotter outside air from flowing in too rapidly and affecting the temperature and cooling ability of the cooling compartment, and the tapered outlet duct provides further cooling of the air discharge by compressing it. The eutectic cold plate serves as a thermal flywheel which increases the cooling abilities of the unit.

The invention has a number of important features and advantages. With the sealed cooling compartment, a small refrigeration unit driven by a low power DC motor can cool a space substantially larger than such a unit could cool without the compartment. The low power requirements make it possible to operate the system with solar power, which makes it both self-sufficient and economical to operate. It is particularly suitable for use in a variety of small structures such as ticket boots, guard shacks, kiosks and automobiles.

It is apparent from the foregoing that a new and improved air conditioning system and method have been provided. While only certain presently preferred embodiments have been described in detail, as will be apparent to those familiar with the art, certain changes and modifications can be made without departing from the scope of the invention as defined by the following claims.

I claim:

1. An air conditioning system, comprising: a solid cube of insulative material, a cooling compartment located at the center of the cube having a height, width and depth which are approximately equal to one-third of the height, width and depth of the cube, a cooling element within the cooling compartment, means for circulating a refrigerant through the cooling element to cool air within the compartment, and means for blowing the cooled air out of the compartment and into a space to be cooled.

2. The air conditioning system of claim 1 further including a cold plate comprising a coil filled with a eutectic material within the cooling compartment.

3. The air conditioning system of claim 1 including a tapered outlet duct through which the cooled air is blown out of the cooling compartment.

4. The air conditioning system of claim 1 including a tapered inlet duct through which air is drawn into the cooling compartment.

5. An air conditioning system, comprising: a rectangular block of insulative material, a cooling compartment within the block having a size and a location such that the compartment is surrounded on all sides by the insulative material to a thickness which is at least one-third of the height, width and depth of the block, a cooling element within the cooling compartment, means for circulating a refrigerant through the cooling element to cool air within the compartment, and means for blowing the cooled air out of the compartment and into a space to be cooled.

6. The air conditioning system of claim 5 further including a cold plate comprising, a coil filled with a eutectic material within the cooling compartment.

7. The air conditioning system of claim 5 including a tapered outlet duct in which the cooled air from the cooling compartment is compressed for expansion into the space to be cooled.

8. The air conditioning system of claim 5 including a tapered inlet duct through which air is.drawn into the cooling compartment.

9. The air conditioning system of claim 5 wherein the means for circulating the refrigerant comprises a low power refrigeration unit which is mounted outside the block and driven by a fractional horsepower motor.

* * * * *